United States Patent [19]

Thomas

[11] 3,876,442
[45] Apr. 8, 1975

[54] PROCESS OF TREATING TITANIUM DIOXIDE PIGMENT

[75] Inventor: David Charles Thomas, Oklahoma City, Okla.

[73] Assignee: Kerr-McGee Chemical Corp., Oklahoma City, Okla.

[22] Filed: Aug. 27, 1973

[21] Appl. No.: 392,015

[52] U.S. Cl............................ 106/300; 106/308 B
[51] Int. Cl............................................... C09c 1/36
[58] Field of Search................ 106/300, 308 B, 309

[56] References Cited
UNITED STATES PATENTS 3,437,502  4/1969  Werner.................................. 106/300
3,676,167  7/1972  Werner.................................. 106/300

Primary Examiner—Winston A. Douglas
Assistant Examiner—J. V. Howard
Attorney, Agent, or Firm—William G. Addison

[57] ABSTRACT

The present invention relates to a process for producing a coated titanium dioxide pigment. More particularly, the process comprises coating an aqueous dispersion of titanium dioxide pigment with an alumina-silica coating under alkaline conditions and thereafter stabilizing the coating by reducing the pH of the aqueous dispersion to from about 2.0 to about 3.8 for a time interval within the range of from 0.1 minute to 4 hours.

10 Claims, No Drawings

PROCESS OF TREATING TITANIUM DIOXIDE PIGMENT

BACKGROUND OF THE INVENTION

It is known to improve the optical properties of titanium dioxide pigment by subjecting the pigment to various treatments, for example, a calcined and milled pigment may be slurried in water with the addition of a dispersing agent, wet milled, hydroclassified and then treated with a water soluble salt of silica, alumina, titania, zirconia and the like or a mixture of such salts. Thereafter, the pH of the slurry is adjusted to precipitate a hydrous oxide coating on the pigment. The slurry subsequently is filtered to recover the hydrous oxide coated pigment which then is washed, dried and milled. Titanium dioxide pigments so treated show improved optical properties. Examples of such coating processes are disclosed in U.S. Pat. Nos. 2,671,081; 3,510,333; 3,510,335; 3,522,078; and 3,676,167.

In U.S. Pat. No. 3,251,705 there is suggested a double coating process for producing titanium dioxide pigment having improved gloss retention and chalk resistance. Titanium dioxide pigment is admixed in an aqueous slurry with water soluble salts of aluminum and silicon. Thereafter, the pH of the admixture is adjusted to hydrolyze the salts and precipitate a hydrous oxide coating on the pigment. The coated pigment then is heated to a temperature sufficient to dry the hydrous oxide. The dried hydrous oxide coated pigment is admixed in a second aqueous slurry with water soluble salts of aluminum and silicon and the coating and drying steps are repeated to provide a double coated pigment.

Recently, in U.S. Pat. No. 3,649,322 there is disclosed a process of producing a coated titanium dioxide pigment wherein an alumina-silica coating is effected under alkaline conditions. In accordance with the process disclosed therein, an aqueous slurry of titanium dioxide pigment is formed. The pH of the slurry is adjusted to from 8.5 to 10.5 and a hydrous silicon oxide and a hydrous aluminum oxide are co-precipitated onto the titanium dioxide in the aqueous slurry to form an alumina-silica coating. In accordance with an embodiment of the process disclosed therein the coated titanium dioxide pigment is given an optical coating of sponge alumina. The optional coating is effected by reducing the pH of the aqueous slurry to 5.0–5.5 and precipitating a hydrous aluminum oxide coating on the coated titanium dioxide pigment. However, the optical properties and dispersibility of the pigment produced in accordance with such a process are not entirely satisfactory. Obviously, therefore, there still is need for an improved process for producing a coated titanium dioxide pigment having improved optical qualities and dispersibility.

SUMMARY OF THE INVENTION

Broadly, the present invention relates to an improved process for producing a coated titanium dioxide pigment. An aqueous slurry of a titanium dioxide pigment is formed. The pH of the slurry is adjusted to at least about 9.7. Thereafter, a water soluble salt of silica and aluminum are added to the slurry whereby an alumina-silica coating is precipitated onto the pigment. The pH of the slurry then is adjusted to from about 2.0 to 3.8 for a time of from about 0.1 minute to about 4 hours to stabilize the alumina-silica coating. In accordance with a preferred embodiment, after the coating is stabilized the pH of the slurry is increased to from about 5.0 to about 5.5 and a water soluble salt of aluminum is added to the slurry whereby an oxide of alumina is precipitated onto the pigment to provide a second coating.

DESCRIPTION OF A PREFERRED EMBODIMENT

The present invention relates to a process for producing titanium dioxide pigment having improved optical qualities. More particularly, the present invention provides a process for coating titanium dioxide pigment with an alumina-silica coating under alkaline conditions which is stabilized by a subsequent acid treatment. The process is applicable to titanium dioxide produced in any manner such as, for example, by the sulfate process or vapor phase oxidation process and is applicable to anatase, rutile or mixtures thereof.

Advantageously, the titanium dioxide pigment is wet milled and hydroclassified to provide a pigment of substantially uniform particle size prior to treatment in accordance with the present invention. In practicing the process of the present invention, titanium dioxide pigment is dispersed in an aqueous slurry containing from about 200 to 600 grams of titanium dioxide per liter of solution; preferably about 400 grams of titanium dioxide per liter of solution.

A dispersing agent may be added to the slurry to improve the dispersibility of the titanium dioxide pigment. Examples of suitable dispersing agents include sodium hexametaphosphate, sodium polyphosphate, sodium hydroxide and the like.

The slurry may be treated at any temperature of from about ambient up to about its boiling point. It has been found that particularly good results are obtained if the slurry temperature is maintained at about 140°F. during treatment in accordance with the present invention. The slurry also should be agitated during treatment to ensure a uniform coating on the pigment. The agitation preferably is accomplished by mechanical means such as, for example, a paddle stirrer or the like.

During the first coating, the pH of the slurry is adjusted to and maintained at least about 9.7 and preferably above about 11.0. To the slurry is added an ionizable water soluble silicon salt and at least one ionizable water soluble aluminum salt. The salts are added in an amount sufficient to provide from about 1 to 5 weight percent of each salt calculated as the corresponding oxide providing further that the water soluble salts of silicon and aluminum are added in amounts such that the total amount of coating, calculated as oxide, added is in the range of from about 2 to 10 percent. Unless otherwise indicated, all percentages referred to herein are weight percent based on the total weight of titanium dioxide pigment. Examples of suitable water soluble silicon salts include sodium silicate, potassium silicate, silicon halides and silicic acid.

The water soluble aluminum salt generally is added as an aqueous solution. The suitable aluminum salts include aluminum chloride, aluminum nitrate, aluminum sulfate, sodium aluminate, potassium aluminate and the like.

The present invention relates specifically to the stabilization of titanium dioxide pigment coated with alumina-silica. It is, therefore, an essential feature of the present invention that the alumina and silica be co-precipitated on the pigment at a pH of at least 9.7. As those versed in the art will appreciate the specific manner in which the water soluble salts of silicon and aluminum are added is not critical provided that they are added in such a manner as to effect the desired co-precipitation. More particularly, the water soluble salts of silicon do not precipitate at a pH above 9.7 whereas the water soluble salt of aluminum will precipitate at any pH within the range of from about 3 to about 11.3. Obviously, therefore, to effect the desired co-precipitation at a pH below 11.3 it is essential that the silicon salt either be added first or alternatively that the water soluble salt of silicon and aluminum be added simultaneously. When the co-precipitation is to be effected at a pH above 11.3, however, the water soluble salts of silicon and aluminum may be added in any desired sequence.

A particularly preferred combination of salts is sodium silicate and sodium aluminate, each being added in an amount sufficient to provide about 2.5 percent by weight calculated as the corresponding oxide. The silica preferably is added first. The purpose of adding a combination of a silica salt and a water soluble aluminum salt to the alkaline slurry is, of course, to precipitate a hard dense alumina-silica coating on the pigment.

Following addition of water soluble salts of aluminum and silica to the slurry, it is advantageous to maintain the slurry at the prescribed temperature and pH for a time of from about 30 minutes to 1 hour to ensure a uniform coating of oxide on the pigment. The slurry preferably is agitated during this time.

In accordance with the present invention the alumina-silica coating on the pigment then is stabilized. The stabilization is accomplished by lowering the pH of the slurry to from about 2.0 to 3.8 and maintaining that pH for from about 0.1 minute to about 4 hours. Preferably, the pH is lowered to from about 2.5 to 3.5. As those versed in the art will appreciate, at such low pH values the alumina-silica coating is slowly dissolved. It is essential, therefore, that the slurry not be maintained at a pH of below about 3.8 for a time in excess of about 4 hours. Generally, the acid treatment time is within the range of from about 15 to 60 minutes to ensure that a uniform pH is obtained throughout the slurry and preferably the time is from about 15 minutes to about 30 minutes.

Any alumina-silica dissolved at the low pH will, of course, re-precipitate on the pigment when the slurry pH is raised. Such a re-precipitated coating is of a different nature than the alumina-silica coating precipitated under alkaline conditions and is not a part of the present invention.

Pigments stabilized in accordance with the present invention have better optical properties, than those which have not been so prepared. Further, for reasons not fully understood, the present stabilization treatment also improves the dispersibility of the pigment when it is incorporated into a paint formulation.

The inventor does not wish to be bound by any particular theory, however, it is thought that perhaps the improvement is associated with the destruction of certain so-called "acid sites" that are reported to exist on an alumina-silica compound formed under alkaline conditions. For a more detailed discussion of the existence of such acid sites see *The Colloid Chemistry of Silica and Silicates*, by R. K. Iler, Cornell University Press (1955) and the references cited therein. The acid sites are destroyed by subjecting the alumina-silica to an acid treatment at a pH of less than 3.8.

In accordance with a preferred embodiment of the present invention, the pigment is given a second coating after stabilization of the alumina-silica coating. The pH of the slurry is adjusted to from about 5.0 to about 5.5 and there is added thereto another ionizable water soluble metal salt to effect an acid coating. The metal salt is added in an amount sufficient to provide an oxide coating in the range of from about 0.1 to 1.0 percent by weight and preferably about 0.5 percent.

The applicable water soluble metal salts include those alkaline aluminum salts which will precipitate an oxide coating on the titanium dioxide in an acidic dispersion. The preferred metal salt is sodium aluminate. When an alkaline salt such as sodium aluminate is used and it is desired to maintain the slurry pH within the initial range of from about 5.0 to 5.5, an acid is added simultaneously with the alkaline salt. The applicable acids include mineral acids such as, for example, sulfuric acid, hydrochloric acid and nitric acid.

Generally, it is preferred to increase the pH of the slurry to flocculate the pigment prior to recovering the coated pigment, for example, the pH of the slurry may be increased to from about 6 to 7 by the addition thereto of a basic solution. The coated pigment then is readily recoverable from the slurry by filtration. Thereafter, the coated pigment is washed, dried, ground and bagged.

Obviously, the pigment may be coated with oxides prior to or after treatment in accordance with the present invention. Such additional coatings may be either alkaline or acid coatings of the aforementioned oxides or oxides of other compounds such as, for example, titanium, zirconium and the like. However, such other coatings are not necessary.

The following Examples are set forth for the sole purpose of illustrating the process of the present invention. As those versed in the art will appreciate the numbers shown in the examples for gloss and dispersibility are not absolute values. The gloss and dispersibility of pigment is strongly influenced by numerous factors such as amount and type of wetting or dispersing agent, if any, used during milling prior to or after treatment and the other variables associated with milling or grinding operations.

The amount of improvement obtained with the present process will vary, therefore, with individual lots of pigment. Indeed in an individual test the other variables may combine to indicate that the gloss and dispersibility are either not improved or are deteriorated by the present process. The following examples, therefore, do not represent the improvement to be expected on any individual test sample, rather, they are representative of an average improvement that is indicated from a series of test samples obtained over a period of time.

EXAMPLE I

An aqueous slurry of titanium dioxide pigment is continuously agitated with a paddle stirrer and maintained at a temperature of approximately 140°F. The pH of the slurry is adjusted to above 9.7 by the addition thereto of an aqueous solution of sodium hydroxide. To the slurry then is added an aqueous solution containing sodium silicate in an amount sufficient to provide about 2 percent by weight of silica, calculated as $SiO_2$, based on the weight of the pigment.

The slurry is digested for 30 minutes to insure complete mixing and an aqueous solution of sodium aluminate then is added in an amount sufficient to provide about 2 percent by weight of alumina calculated as $Al_2O_3$ based on the total weight of the pigment. The slurry is digested for about 15 minutes to insure that all the alumina and silica have precipitated. Thereafter the pH of the slurry is reduced to about 3 using sulfuric acid and digested for about 15 minutes to stabilize the pigment coating.

The pH of the slurry then is raised to about 6 by the addition thereto of an aqueous solution of sodium hydroxide. The pigment is recovered by filtration, washed, dried, ground and designated pigment A. Another quantity of an aqueous slurry of titanium dioxide pigment is prepared in accordance with the same procedure, except without digesting the slurry at a pH of about 3 to stabilize the coating, and designated pigment B.

Each pigment is tested for low shear dispersibility (50 grams pigment and 200 grams of linseed oil). The results of the test are as set forth in Table I below. Samples of paint formulations also are prepared using each of the pigments and tested for gloss. Each paint formulation is given the same letter designation as the pigment from which it is prepared. The results of the gloss test also are shown in Table I below.

TABLE I

| Sample | A | B |
|---|---|---|
| Acrylic Gloss 60°/20° | 78 46 | 76 41 |
| Baking Enamel Gloss, 60°/20° | 93 66 | 93 67 |
| Low Shear + Dispersibility | 23 | * |

+ In a low shear dispersion test the lower number is preferred. More particularly, a number of about 20 or less is preferred and less than 10 is excellent.
* A number in excess of 50.

EXAMPLE II

A previously wet milled slurry of titanium dioxide pigment is obtained containing 400 grams of pigment per liter of slurry.

The slurry is continuously agitated with a paddle stirrer and maintained at a temperature of approximately 140°F. The pH of the slurry is adjusted by adding thereto a sufficient amount of sodium hydroxide to provide an initial pH of 9.7. To the slurry then is added an aqueous solution containing sodium silicate in an amount sufficient to provide about 2 percent by weight of silica, calculated as $SiO_2$, based on the weight of pigment.

The slurry is digested for 30 minutes to ensure complete mixing and an aqueous solution of sodium aluminate then is added in an amount sufficient to provide about 2 percent by weight of alumina, calculated as $Al_2O_3$, based on the total weight of pigment. The slurry is digested for about 15 minutes to ensure that all of the alumina and silica have precipitated. Thereafter, the pH of the slurry is reduced to about 3.1 using sulfuric acid and digested for about 15 minutes to stabilize the pigment coating.

The pH of the slurry then is raised to about 5.2 by the addition thereto of an aqueous solution of sodium hydroxide. To the slurry is added an aqueous solution of sodium aluminate in an amount sufficient to provide an optional second coating comprising about 0.5 percent by weight alumina. During this addition the pH of the slurry is allowed to increase to about 8 to 9.

Subsequently, the pH of the slurry is adjusted to about 6.0 to flocculate the pigment by the addition thereto of a solution of sulfuric acid and then digested for 15 minutes. The pigment is recovered by filtration, washed, dried, ground and designated pigment A.

An additional quantity of pigment is prepared in accordance with the procedure outlined above except without the pH 2.0 to 3.8 stabilization treatment of the present invention and designated pigment B.

Each pigment is tested for low shear dispersibility (50 gm pigment in 200 gm of linseed oil). The results are as set forth in Table II below. Samples of paint formulations also are prepared using each of the pigments and tested for gloss. Each paint formulation is given the same letter designation as the pigment from which it is prepared. The results of the gloss tests also are shown in Table II.

TABLE II

| Test | A | B |
|---|---|---|
| Low Shear Dispersion | 7 | 19 |
| Acrylic Gloss 60°/20° | 76/40 | 72/29 |
| Baking Enamel Gloss 60°/20° | 94/74 | 90/58 |

Thus, this example demonstrates the improved optical properties and dispersibility of pigment treated in accordance with a preferred embodiment of the present invention.

EXAMPLE III

A quantity of an aqueous slurry of titanium dioxide is obtained. The slurry is treated in accordance with the procedure of Example II and designated pigment A. Another quantity of pigment is prepared in the same manner except without the pH 2.0 to 3.8 stabilization treatment and labeled pigment B.

A portion of each pigment then is tested for low shear dispersibility and the results are set forth in Table III below. The remaining portions of the pigment are stored in a chamber maintained at 75° and 50 percent relative humidity. At the intervals indicated in Table II below additional portions of each pigment are removed, tested for low shear dispersibility and the results are as tabulated in Table III.

TABLE III

| DAYS AT 75°F. and 50% RELATIVE HUMIDITY | SAMPLE A | B |
|---|---|---|
| 0 | 10 | 26 |
| 10 | 16 | * |
| 22 | 15 | * |
| 52 | 22 | * |
| 245 | 21 | * |

* A dispersion number greater than 50.

The foregoing data demonstrates the improved stability of pigment treated in accordance with the present invention. More particularly, after 245 days pigment A still has an acceptable dispersibility value. Pigment B, however, has an unacceptable dispersibility value after only 10 days.

EXAMPLE IV

The following example is set forth to illustrate the effect of time on the acid stabilization treatment of the present invention. A quantity of an aqueous slurry of titanium dioxide is obtained. Another aqueous slurry of TiO₂ pigment is obtained. A quantity of that slurry is continuously agitated with a paddle stirrer and maintained at a temperature of approximately 140°F. The pH of the slurry is adjusted to about 9.7. To the slurry then is added an aqueous solution containing sodium silicate in amounts sufficient to provide about 2.5 percent by weight of silica based on the weight of the pigment.

The slurry is digested for 30 minutes to ensure mixing and an aqueous solution of sodium aluminate then is added in an amount sufficient to provide 2.5 percent by weight of alumina based on the total weight of pigment. The slurry is digested for about 15 minutes to ensure complete precipitation of an alumina-silica coating. Thereafter, the pH of individual portions of the slurry reduced to about 3 and digested for various time intervals to stabilize the pigment coating as indicated in Table IV below.

The pH of each of the slurries then is raised to about 5.2. To each slurry is added an aqueous solution of sodium aluminate in an amount sufficient to provide about 0.5 percent by weight of alumina. During this addition the pH of the slurry is maintained between about 5 and 5.5 by the simultaneous addition of sulfuric acid.

Subsequently the pH of each slurry is adjusted to about 6.0 to flocculate the pigment and it is digested for 15 minutes. The pigment is recovered by filtration, washed, dried, ground and tested.

A sample of each pigment then is tested. The pigment samples are tested for low shear dispersibility and paint formulations made from the respective samples are tested for gloss. The results of the tests are tabulated in Table IV below.

TABLE IV

| TEST | TREATED PIGMENT TREATMENT TIME AT pH 3.0 | | | | | | |
|---|---|---|---|---|---|---|---|
| | Minutes | | | | Hours | | |
| | 0.1 | 15 | 30 | 60 | 2 | 4 | 6 |
| Baking Gloss 60°/20° | 89 | 90 | 89 | 92 | 91 | 89 | 89 |
| Acrylic Gloss 60°/20° | 65 | 64 | 63 | 63 | 60 | 59 | 59 |
| | 76 | 78 | 75 | 75 | 73 | 72 | 73 |
| Low Shear Dispersibility | 43 | 45 | 37 | 38 | 36 | 33 | 37 |
| | 6 | 9 | 10 | 10 | 15 | 15 | 18 |

The foregoing test results demonstrate the improvement in dispersibility obtained with pigments treated in accordance with the present process. Further, the dispersibility results indicate that the improvement is obtained throughout a time interval of from about 0.1 minute up to about 4 hours.

It also will be noted that the optimum treatment time appears to be about 0.1 minutes. However, when treating a commercial quantity of an aqueous slurry of titanium dioxide pigment, it is difficult, if not impossible, to be certain that the slurry pH is uniform with such a short treatment time. Therefore, the slurry generally is treated for a time of from about 15 minutes to about 60 minutes to ensure a uniform pH throughout the slurry and preferably for a time of from about 15 minutes to about 30 minutes.

EXAMPLE V

The following example is set forth to demonstrate the effect of pH on the stabilization treatment of the present process. Additional quantities of titanium dioxide pigment are processed in accordance with the coating procedure of Example II except the stabiliation treatment is conducted at varying pH values as indicated in Table V below.

Samples of each of the pigments are tested for low shear dispersibility. In addition, samples of each pigment are incorporated into paint formulations and tested for gloss. The results of the tests are as indicated in Table V below.

TABLE V

| SAMPLE | LOW SHEAR DISPERSIBILITY | ACRYLIC GLOSS 60°/20° | BAKING ENAMEL GLOSS 60°/20° |
|---|---|---|---|
| pH 1.5 | 28 | 75/40 | 93/64 |
| pH 2.5 | 18 | 77/47 | 94/69 |
| pH 3.0 | 8 | 79/47 | 97/74 |
| pH 3.5 | 13 | 77/45 | 94/67 |
| pH 4.0 | 30 | 73/35 | 93/63 |
| pH 4.5 | 29 | 75/39 | 94/64 |

From the foregoing data it is seen that beneficial results are obtained at a stabilization treatment pH of between 1.5 and 4.0. The limiting range for effective results is believed to be from about 2.0 to 3.8. A preferred treatment pH is within the range of from about 2.5 to 3.5 and a pH of about 3.0 is believed to give optimum results.

What is claimed is:

1. A process for treating titanium dioxide pigment in an aqueous slurry comprising the steps of:
    a. adjusting and maintaining the pH of the slurry at at least about 9.7 while adding water soluble salts of aluminum and silica to coprecipitate said salts and form an alumina-silica coating on the pigment;
    b. adjusting the pH of the slurry to from about 2.0 to 3.8, maintaining the slurry at that pH for a time of from 0.1 minute to about 4 hours;
    c. adjusting the pH of the slurry to from about 6 to 7 to flocculate the pigment; and
    d. recovering the coated titanium dixoide pigment.

2. The process of claim 1 wherein said water-soluble salts of step (a) are added in an amount sufficient to provide from about 2 to 10 percent by weight of alumina-silica coating.

3. The process of claim 1 wherein the water-soluble salts of step (a) are sodium aluminate and sodium silicate.

4. The process of claim 1 wherein in step (b) the pH of the slurry is adjusted to from about 2.5 to 3.5 and maintained at that pH for a time of from about 15 to 60 minutes.

5. The process of claim 4 wherein said water-soluble salts of step (a) are added in an amount sufficient to provide from about 2 to 10 percent by weight of alumina-silica coating.

6. The process of claim 4 wherein the water-soluble salts of step (a) are sodium aluminate and sodium silicate.

7. The process of claim 1 wherein intermediate step (b) and (c) the pH of the slurry is increased to from about 5.0 to 5.5 and a water-soluble salt of aluminum is added to the slurry in an amount sufficient to provide from about 0.1 to about 10 percent by weight of alumina coating.

8. The process of claim 7 wherein the pH is maintained at from about 5.0 to 5.5 during the addition of the water-soluble salt of aluminum.

9. The process of claim 8 wherein said water-soluble salt is sodium aluminate.

10. The process of claim 7 wherein in step (b) the Ph of the slurry is adjusted to from about 2.5 to 3.5 and maintained at that pH for a time of from about 15 to 60 minutes.

* * * * *